United States Patent
Ono et al.

(10) Patent No.: US 10,637,777 B2
(45) Date of Patent: Apr. 28, 2020

(54) ADDRESS CONVERTING DEVICE, INFORMATION PROCESSING SYSTEM, AND METHOD OF PROVIDING SERVICE

(71) Applicant: FUJITSU LIMITED, Kawasaki-shi, Kanagawa (JP)

(72) Inventors: Asumi Ono, Ota (JP); Keiji Miyauchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 93 days.

(21) Appl. No.: 15/907,330

(22) Filed: Feb. 28, 2018

(65) Prior Publication Data

US 2018/0278526 A1 Sep. 27, 2018

(30) Foreign Application Priority Data

Mar. 23, 2017 (JP) .................................. 2017-057887

(51) Int. Cl.
*H04L 12/741* (2013.01)
*H04L 29/12* (2006.01)
*H04L 12/721* (2013.01)
*H04L 29/08* (2006.01)

(52) U.S. Cl.
CPC ............ *H04L 45/745* (2013.01); *H04L 45/72* (2013.01); *H04L 61/2007* (2013.01); *H04L 61/2535* (2013.01); *H04L 67/10* (2013.01)

(58) Field of Classification Search
CPC ... H04L 45/745; H04L 61/2535; H04L 45/72; H04L 61/2007; H04L 67/10
See application file for complete search history.

(56) References Cited

U.S. PATENT DOCUMENTS

| 6,101,189 | A  | * | 8/2000  | Tsuruoka   | H04L 12/2856 |
|           |    |   |         |            | 370/392      |
| 6,523,696 | B1 | * | 2/2003  | Saito      | H04N 21/2381 |
|           |    |   |         |            | 375/E7.019   |
| 9,344,399 | B2 | * | 5/2016  | Tanimoto   | H04L 63/0272 |
| 9,912,649 | B1 | * | 3/2018  | Alderson   | H04L 63/08   |
| 10,129,747| B2 | * | 11/2018 | Shimoshimano | G06Q 30/0601 |
| 2003/0126239 | A1 | * | 7/2003 | Hwang  | H04L 12/2803 |
|           |    |   |         |            | 709/220      |
| 2003/0131263 | A1 | * | 7/2003 | Keane  | H04L 12/4641 |
|           |    |   |         |            | 726/15       |

(Continued)

FOREIGN PATENT DOCUMENTS

JP  2006-033106   2/2006
JP  2012-222461   11/2012

(Continued)

*Primary Examiner* — Will W Lin
(74) *Attorney, Agent, or Firm* — Fujitsu Patent Center

(57) ABSTRACT

A device for converting an address, the device includes: a memory; and a processor coupled to the memory and configured to: receive a request packet of contents from a first information processing device; convert a first transmission source address included in the request packet to a second transmission source address by using a conversion table corresponding to a communication path of the request packet; and transmit the request packet to a second information processing device which determines whether to provide the contents based on the second transmission source address included in the request packet.

16 Claims, 25 Drawing Sheets

(56) References Cited

U.S. PATENT DOCUMENTS

| | | | | |
|---|---|---|---|---|
| 2007/0091903 | A1* | 4/2007 | Atkinson | H04L 29/12367 |
| | | | | 370/401 |
| 2008/0033955 | A1* | 2/2008 | Fujii | G06F 21/6218 |
| 2010/0269167 | A1* | 10/2010 | Kashima | G06F 21/31 |
| | | | | 726/7 |
| 2012/0254961 | A1* | 10/2012 | Kim | H04L 12/66 |
| | | | | 726/7 |
| 2012/0275328 | A1* | 11/2012 | Iwata | H04L 69/324 |
| | | | | 370/252 |
| 2013/0034099 | A1* | 2/2013 | Hikichi | H04L 61/2532 |
| | | | | 370/392 |
| 2014/0169373 | A1* | 6/2014 | Tanimoto | H04L 63/0272 |
| | | | | 370/392 |
| 2015/0350912 | A1* | 12/2015 | Head | H04W 12/08 |
| | | | | 726/4 |
| 2017/0272373 | A1* | 9/2017 | Chau | H04L 45/72 |
| 2018/0007551 | A1* | 1/2018 | Wang | H04W 12/06 |
| 2018/0013580 | A1* | 1/2018 | Takatori | H04L 12/44 |

FOREIGN PATENT DOCUMENTS

| | | |
|---|---|---|
| JP | 2013-145457 | 7/2013 |
| JP | 2015-133639 | 7/2015 |

\* cited by examiner

FIG. 4

| PORT | IP ADDRESS BEFORE CONVERSION | IP ADDRESS AFTER CONVERSION |
|---|---|---|
| VNET | 192.168.0.10 | 172.168.4.8 |
|  | 192.168.0.130 | 172.168.4.230 |
| VNIC | 172.168.4.230 | 192.168.0.130 |
|  | 172.168.4.8 | 192.168.0.10 |

FIG. 7

| USER | AUTHENTICATION INFORMATION | TRANSMISSION SOURCE IP ADDRESS AFTER CONVERSION |
|---|---|---|
| USER 1 | Xxxxxxx | 172.168.4.8 |
| USER 2 | Yyyyyyy | 172.168.4.9 |
| USER 3 | Zzzzzzz | 172.168.4.10 |

FIG. 8A

| USER | PORTAL |
|---|---|
| USER 1 | PORTAL 1 |
| USER 2 | PORTAL 2 |
| USER 3 | PORTAL 3 |

FIG. 8B

| USER | PATCH |
|---|---|
| USER 1 | PATCH 1 |
| USER 2 | PATCH 2 |
| USER 3 | PATCH 3 |

FIG. 8C

| USER | CONSOLE |
|---|---|
| USER 1 | CONSOLE 1 |
| USER 2 | CONSOLE 2 |
| USER 3 | CONSOLE 3 |

FIG. 14

| VLAN ID | VNET |
|---------|----------|
| 10 | VNET232a |
| 20 | VNET232b |
| 30 | VNET232c |

FIG. 16

| PORT | IP ADDRESS BEFORE CONVERSION | IP ADDRESS AFTER CONVERSION |
|---|---|---|
| VNET | 192.168.0.10 | 172.168.4.8 |
| | 192.168.0.20 | 172.168.4.8 |
| | 192.168.0.130 | 172.168.4.230 |
| VNIC | 172.168.4.8 | 192.168.0.10 |
| | 172.168.4.8 | 172.168.0.20 |
| | 172.168.4.230 | 192.168.0.130 |

FIG. 18

| USER | AUTHENTICATION INFORMATION | TENANT | IP ADDRESS AFTER CONVERSION |
|---|---|---|---|
| USER 11 | 1aA | TENNANT 1 | 172.168.4.8 |
| USER 12 | 2aA | | |
| USER 13 | 3aA | | |
| USER 21 | 1b8 | TENNANT 2 | 172.168.4.9 |
| USER 31 | 1cD | TENNANT 3 | 172.168.4.10 |

FIG. 23

| TRANSMISSION SOURCE IP ADDRESS BEFORE CONVERSION | PROTOCOL TYPE | PERMIT ACCESS |
|---|---|---|
| 192.168.0.10 | 18000 | NOT PERMIT ACCESS |
| 192.168.0.20 | 18000 | PERMIT |

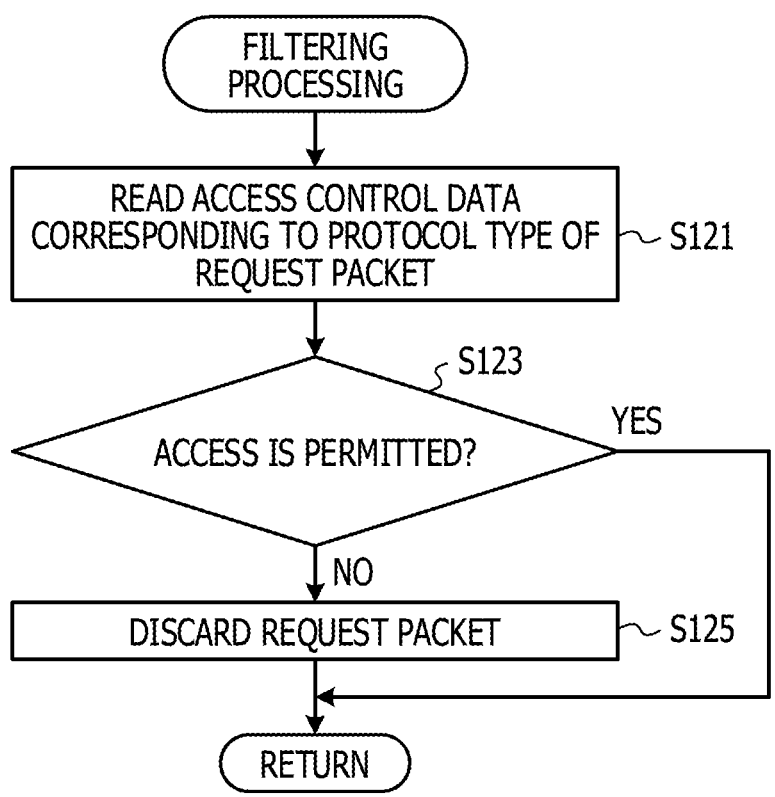

ADDRESS CONVERTING DEVICE, INFORMATION PROCESSING SYSTEM, AND METHOD OF PROVIDING SERVICE

CROSS-REFERENCE TO RELATED APPLICATION

This application is based upon and claims the benefit of priority of the prior Japanese Patent Application No. 2017-057887, filed on Mar. 23, 2017, the entire contents of which are incorporated herein by reference.

FIELD

The embodiments discussed herein are related to an address converting device, an information processing system, and a method of providing a service.

BACKGROUND

In a cloud computing service called an infrastructure as a service (IaaS), a base (e.g., an infrastructure) for constructing and operating a computer system is provided to a user via a network. The base is, for example, a computing resource, a portal, a relevant package, a function of a console connection to a computing resource, and the like.

Related technologies are disclosed in, for example, Japanese Laid-Open Patent Publication No. 2012-222461.

SUMMARY

According to one aspect of the embodiments, a device for converting an address, the device includes: a memory; and a processor coupled to the memory and configured to: receive a request packet of contents from a first information processing device; convert a first transmission source address included in the request packet to a second transmission source address by using a conversion table corresponding to a communication path of the request packet; and transmit the request packet to a second information processing device which determines whether to provide the contents based on the second transmission source address included in the request packet.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a conversion table stored in a conversion table storing unit of the first embodiment;

FIG. 7 is a diagram illustrating an example of data stored in a comparison data storing unit of the first embodiment;

FIGS. 8A to 8C are diagrams illustrating examples of data stored in a content storing unit;

FIG. 14 is a diagram illustrating an example of a relay table used for relay by a VSW;

FIG. 16 is a diagram illustrating an example of a conversion table stored in a conversion table storing unit of the second embodiment;

FIG. 18 is a diagram illustrating an example of data stored in a comparison data storing unit of the second embodiment;

FIG. 23 is a diagram illustrating an example of data stored in an access control data storing unit;

FIG. 25 is a diagram illustrating a flow processing of a filtering processing.

DESCRIPTION OF EMBODIMENTS

In a specific cloud service, a user terminal accesses a server (hereinafter, referred to as a "service server") providing the cloud service via the Internet by using a global Internet protocol (IP) address. However, the foregoing service form has a possibility that false personation by a third party may be incurred by a robbery of an ID and a password of a user. Further, since a common line is used for the access to the service server, there is also a possibility that information may leak to a third party.

Regarding the problem like this, there is a technology which uses a private line, not a common line, but when the private line is used, there is a case where a private IP address of a user overlaps with an IP address among other tenants. In this case, the service server may not identify the user by the IP address, so that there is a problem in providing the cloud service In one aspect, the present disclosure provides a technology for enhancing security of a service provided via a network.

First Embodiment

Figure 1:
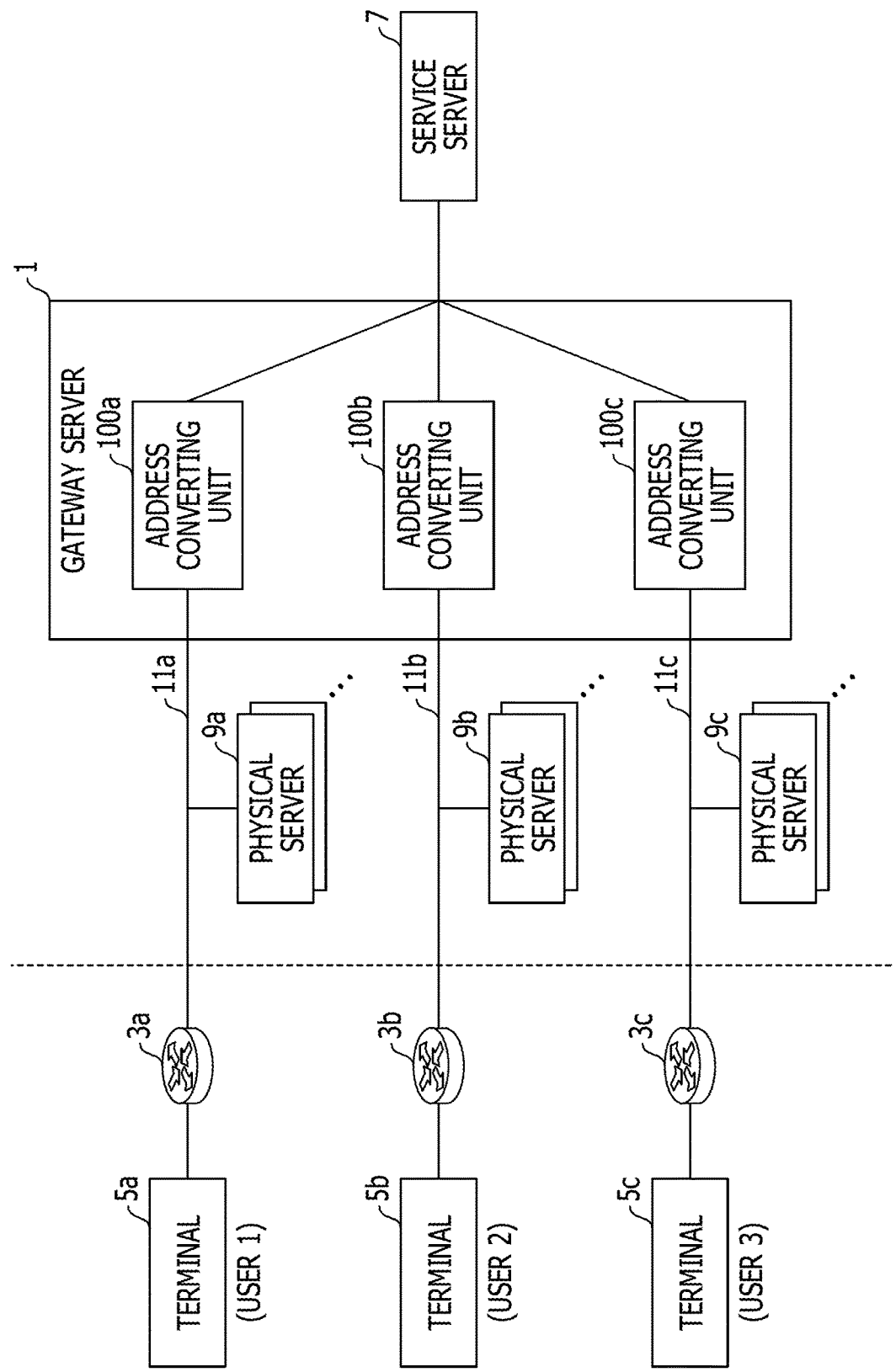
FIG. 1 is a diagram illustrating a system configuration of a first embodiment.

FIG. 1 is a diagram illustrating a system configuration of a first embodiment. A service server 7 is a physical server which provides terminals 5a to 5c of users with a cloud service, and manages the contents (e.g., data of a patch set, data for a console connection function or the like) provided to the terminals 5a to 5c.

A gateway server 1 is a physical server which relays packets transmitted between the terminals 5a to 5c and the service server 7, and includes an address converting unit for each communication path of the terminals 5a to 5c. In the example of FIG. 1, an address converting unit 100a corresponds to a communication path 11a, an address converting unit 100b corresponds to a communication path 11b, and an address converting unit 100c corresponds to a communication path 11c. The address converting units 100a to 100c are implemented as virtual servers.

The terminals 5a to 5c communicate with the service server 7 via, for example, a private line. In the example of FIG. 1, the terminals 5a to 5c belong to different tenants, respectively, and an operator of the terminal 5a is user 1, an operator of the terminal 5b is user 2, and an operator of the terminal 5c is user 3.

Physical servers 9a to 9c include physical resources allocated to the terminals 5a to 5c by the cloud service, and virtual machines are operated in the physical servers 9a to 9c. For example, the user 1 of the terminal 5a uses the physical server 9a, the user 2 of the terminal 5b uses the physical server 9b, and the user 3 of the terminal 5c uses the physical server 9c.

Routers 3a to 3c are relay devices which relay packets transmitted between the terminals 5a to 5c and the service server 7. In FIG. 1, a right portion of a broken line corresponds to a cloud service environment.

Further, in FIG. 1, the number of terminals is three, but is not limited.

Figure 2:
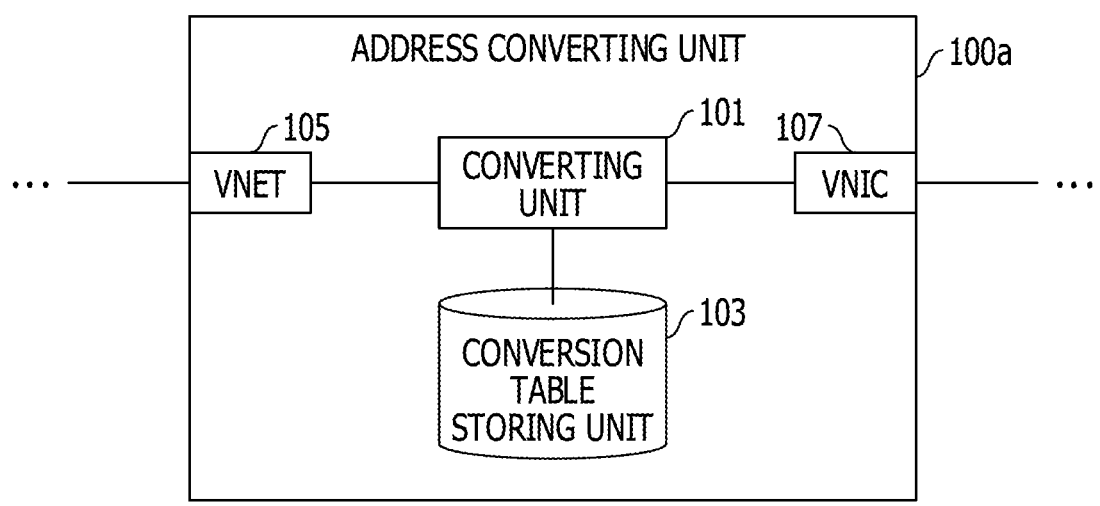
FIG. 2 is a functional block diagram of an address converting unit of the first embodiment.

FIG. 2 is a functional block diagram of the address converting unit 100a. The address converting unit 100a includes a converting unit 101, a conversion table storing unit 103, a virtual network (VNET) 105 corresponding to a virtual port, and a virtual network interface card (VNIC) 107 corresponding to a virtual network interface card.

The converting unit 101 converts an IP address included in a request packet received via the VNET 105 by using the conversion table stored in the conversion table storing unit 103, and outputs the request packet including the converted IP address to the VNIC 107. Further, the converting unit 101 converts an IP address included in a response packet received via the VNIC 107 by using the conversion table stored in the conversion table storing unit 103, and outputs the response packet including the converted IP address to the VNET 105.

Figure 3:
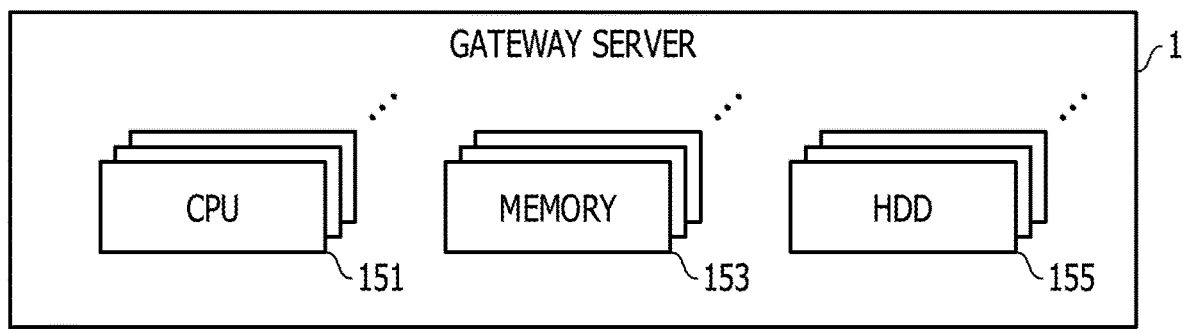
FIG. 3 is a configuration diagram of hardware of a gateway server.

The converting unit 101, the VNET 105, and the VNIC 107 are implemented when a program stored in a memory 153 of FIG. 3 is executed by a central processing unit (CPU) 151 of FIG. 3. The conversion table storing unit 103 is provided in, for example, the memory 153 or a hard disk drive (HDD) 155 of FIG. 3.

Further, the functional block configurations of the address converting unit 100b and the address converting unit 100c are the same as the functional block configuration of the address converting unit 100a. However, the address converting units 100a to 100c include different conversion tables, respectively.

FIG. 4 is a diagram illustrating an example of the conversion table stored in the conversion table storing unit 103. The conversion table includes an IP address before the conversion and an IP address after the conversion for each of the VNET and the VNIC. In the example of FIG. 4, the IP address included in the request packet received via the VNET 105 is converted by using an entry of the first row or an entry of the second row, and the IP address included in the response packet received via the VNIC 107 is converted by using an entry of the third row or an entry of the fourth row.

Figure 5:
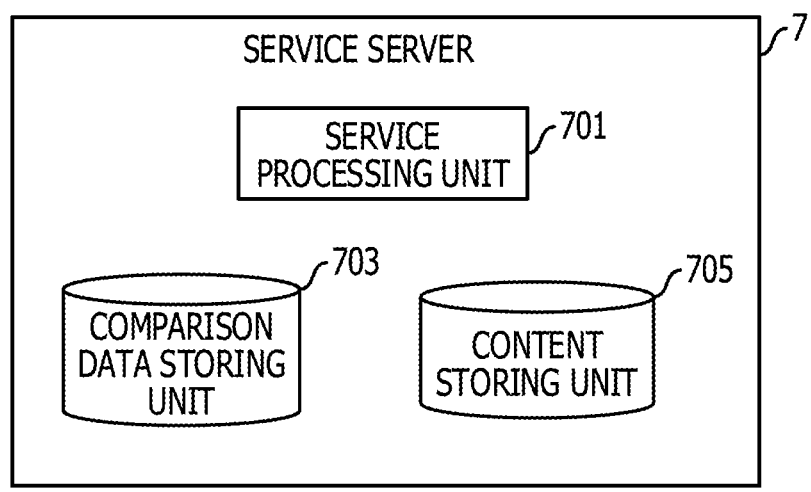
FIG. 5 is a functional block diagram of a service server of the first embodiment.

FIG. 5 is a functional block diagram of the service server 7. The service server 7 includes a service processing unit 701, a comparison data storing unit 703, and a content storing unit 705. The service processing unit 701 determines whether the request packet is the request packet received from the terminal of the genuine user based on the data included in the request packets received from the terminals 5a to 5c via the gateway server 1 and the data stored in the comparison data storing unit 703. When the request packet is the request packet received from the terminal of the genuine user, the service processing unit 701 transmits a response packet including contents read from the content storing unit 705 to a terminal of a user of a transmission source of the request packet.

Figure 6:
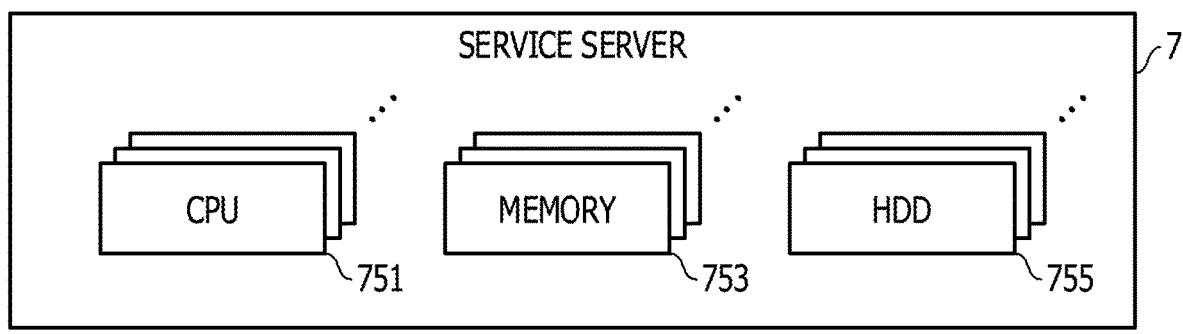
FIG. 6 is a configuration diagram of hardware of the service server.

Further, the service processing unit 701 is implemented when a program stored in a memory 753 of FIG. 6 is executed by a CPU 751 of FIG. 6. The comparison data storing unit 703 and the content storing unit 705 are provided in, for example, the memory 753 or an HDD 755 of FIG. 6.

FIG. 7 is a diagram illustrating an example of data stored in the comparison data storing unit 703. In the example of FIG. 7, user identification information (in the present embodiment, user account information, such as an account name), authentication information (in the present embodiment, a password), and an IP address of a transmission source after the conversion are stored. The user identification information and the authentication information are used in log-in to the terminal and the like.

FIGS. 8A to 8C are diagrams illustrating examples of data stored in the content storing unit 705. In FIG. 8A, data for a portal is stored for each user. In FIG. 8B, data for a patch is stored for each user. In FIG. 8C, data for a console connection is stored for each user.

Figure 9:
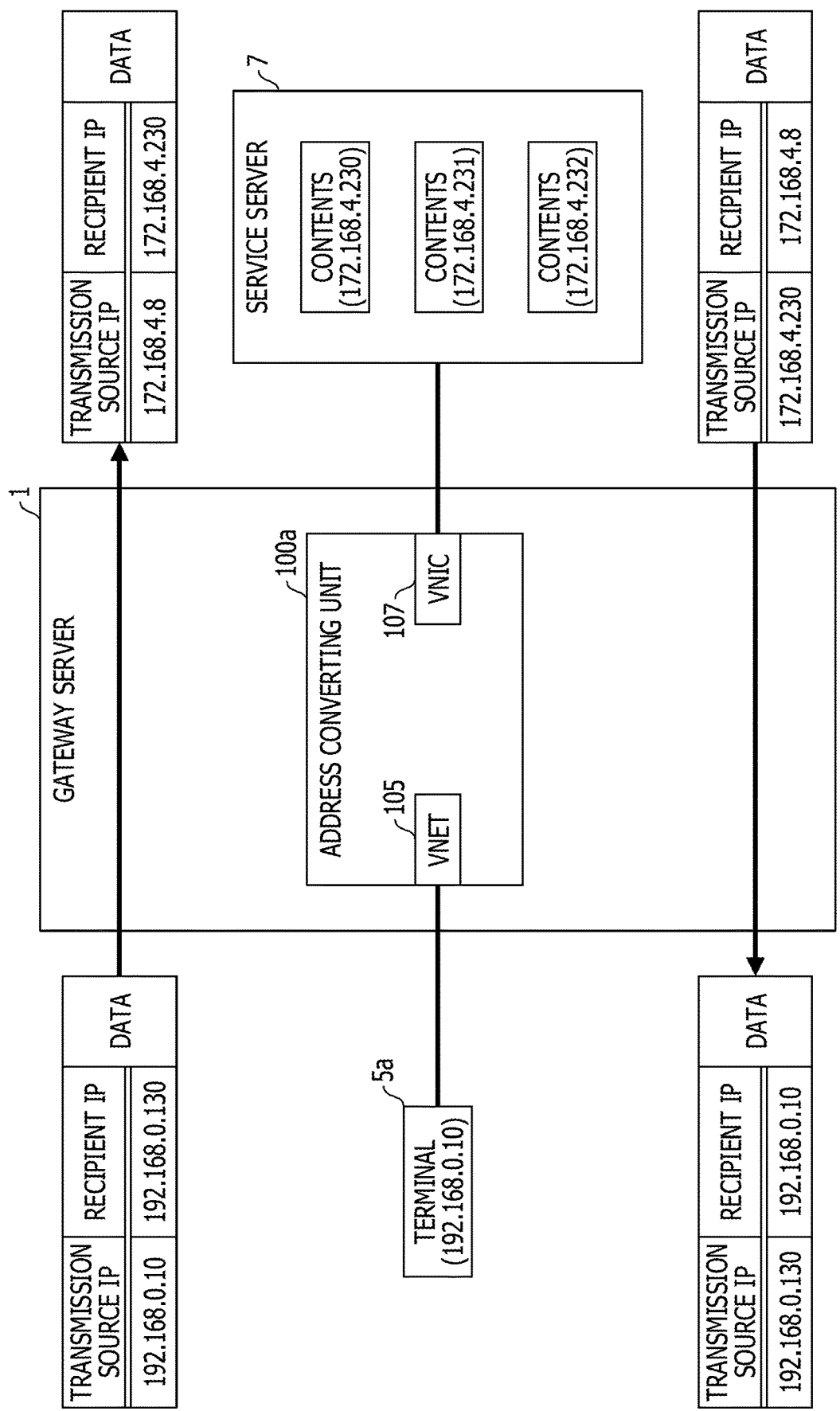
FIG. 9 is a diagram illustrating an example of an address conversion of the first embodiment.

FIG. 9 is a diagram illustrating a example of an address conversion of the first embodiment. Herein, it is assumed that the address conversion is performed by using the conversion table illustrated in FIG. 4. For example, it is assumed that the terminal 5a transmits a request packet in which a transmission source IP address is "192. 168. 0. 10" and a recipient IP address is "192. 168. 0. 130". The address converting unit 100a of the gateway server 1 receives the request packet via the VNET 105, and converts the transmission source IP address and the recipient IP address by using the conversion table stored in the conversion table storing unit 103. Particularly, the transmission source IP address is converted to an IP address "172. 168. 4. 8" of the service server side of the address converting unit 100a that is the virtual server, and the recipient IP address is converted from "192. 168. 0. 130" to "172. 168. 4. 230". The request packet including the converted address is transmitted to the service server 7.

The service server 7 executes a comparison by using the transmission source IP address included in the received request packet, and the user identification information and the authentication information, and confirms whether the received request packet is the request packet transmitted from the terminal of the genuine user. When it is confirmed that the received request packet is the request packet transmitted from the terminal of the genuine user, the service server 7 transmits a response packet including requested contents. A transmission source IP address of the response packet is "172. 168. 4. 230", and a recipient IP address of the response packet is "172. 168. 4. 8".

The address converting unit 100a of the gateway server 1 receives the response packet via the VNIC 107, and converts the transmission source IP address and the recipient IP address by using the conversion table stored in the conversion table storing unit 103. For example, the transmission source IP address is converted to an IP address "192. 168. 0. 130" of the terminal side of the address converting unit 100a that is the virtual server, and the recipient IP address is converted from "172. 168. 4. 8" to "192. 168. 0. 10".

Figure 10:
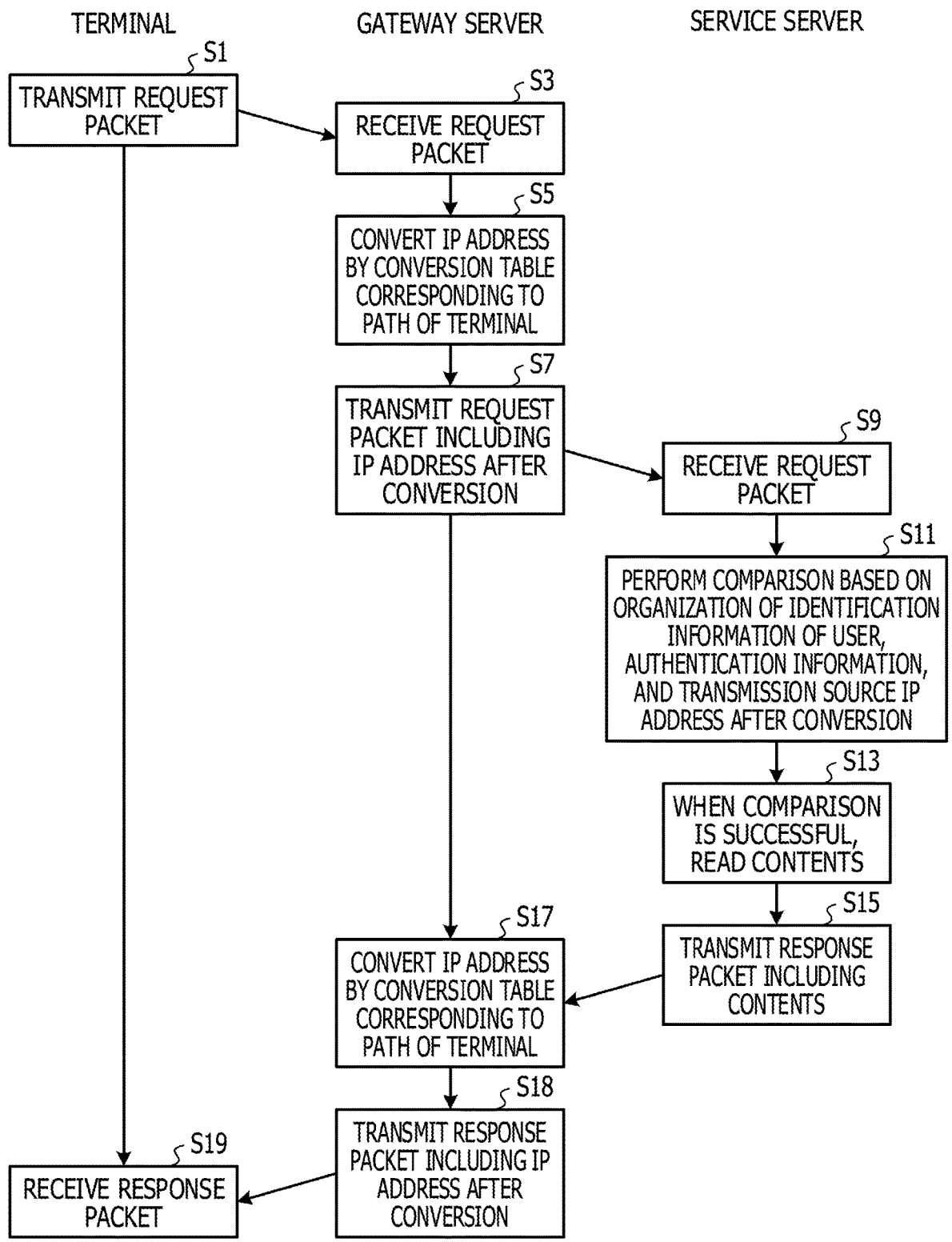
FIG. 10 is a diagram illustrating a processing flow of a processing executed in a system of the first embodiment.

Next, the processing executed in the first embodiment will be described with reference to FIGS. 10 to 12. Herein, it is assumed that the terminal 5a transmits a request packet of contents.

The terminal 5a generates a request packet of contents managed by the service server 7. The request packet includes user identification information, user authentication information, a transmission source IP address, a recipient IP address, and the like. Then, the terminal 5a transmits the generated request packet (step S1 of FIG. 10).

The converting unit 101 of the address converting unit 100a of the gateway server 1 receives the request packet transmitted in step S1 via the VNET 105 (step S3).

The converting unit 101 converts the transmission source IP address and the recipient IP address included in the request packet by using the conversion table corresponding to a communication path (herein, the communication path 11a) of the request packet received in step S3 (step S5).

The converting unit 101 transmits the request packet including the transmission source IP address after the conversion and the recipient IP address after the conversion (that is, the request packet including the converted transmission source IP address and recipient IP address) to the service server 7 via the VNIC 107 (step S7).

The service processing unit 701 of the service server 7 receives the request packet transmitted by the gateway server 1 (step S9).

The service processing unit 701 determines whether an entry having the same organization as the organization of the user identification information, the authentication information, and the transmission source IP address after the conversion included in the received request packet is stored in the comparison data storing unit 703 (step S11).

When the comparison is successful (e.g., the case where the entry having the same organization as the organization of the target is stored in the comparison data storing unit 703), the service processing unit 701 reads contents specified by the recipient IP address included in the request packet from the content storing unit 705 (step S13).

The service processing unit 701 transmits the response packet including the contents read in step S13 with the transmission source of the request packet as a recipient and the recipient of the request packet as a transmission source (step S15). The response packet is transmitted to the address converting unit (herein, the address converting unit 100a) including the same IP address as the recipient IP address.

The converting unit 101 of the address converting unit 100a receives the response packet via the VNIC 107. Then, the converting unit 101 converts the transmission source IP address and the recipient IP address included in the response packet by using the conversion table corresponding to the communication path (hereinafter, the communication path 11a) through which the response packet is transmitted (step S17).

The converting unit 101 transmits the response packet including the transmission source IP address after the conversion and the recipient IP address after the conversion (e.g., the response packet including the converted transmission source IP address and recipient IP address) to the terminal 5a via the VNET 105 (step S18).

Then, the terminal 5a receives the response packet from the gateway server 1 (step S19).

As described above, in the first embodiment, the address converting unit operated as a proxy is provided in each physical communication path and the address converting units execute the address conversion by using the different conversion tables, respectively. The transmission source IP address after the conversion corresponds to the IP address of the address converting unit. When the IP address is used, the fact whether the access is made from a genuine communication path may be confirmed, so that it is possible to prevent an unauthorized access to enhance the security.

Figure 11:
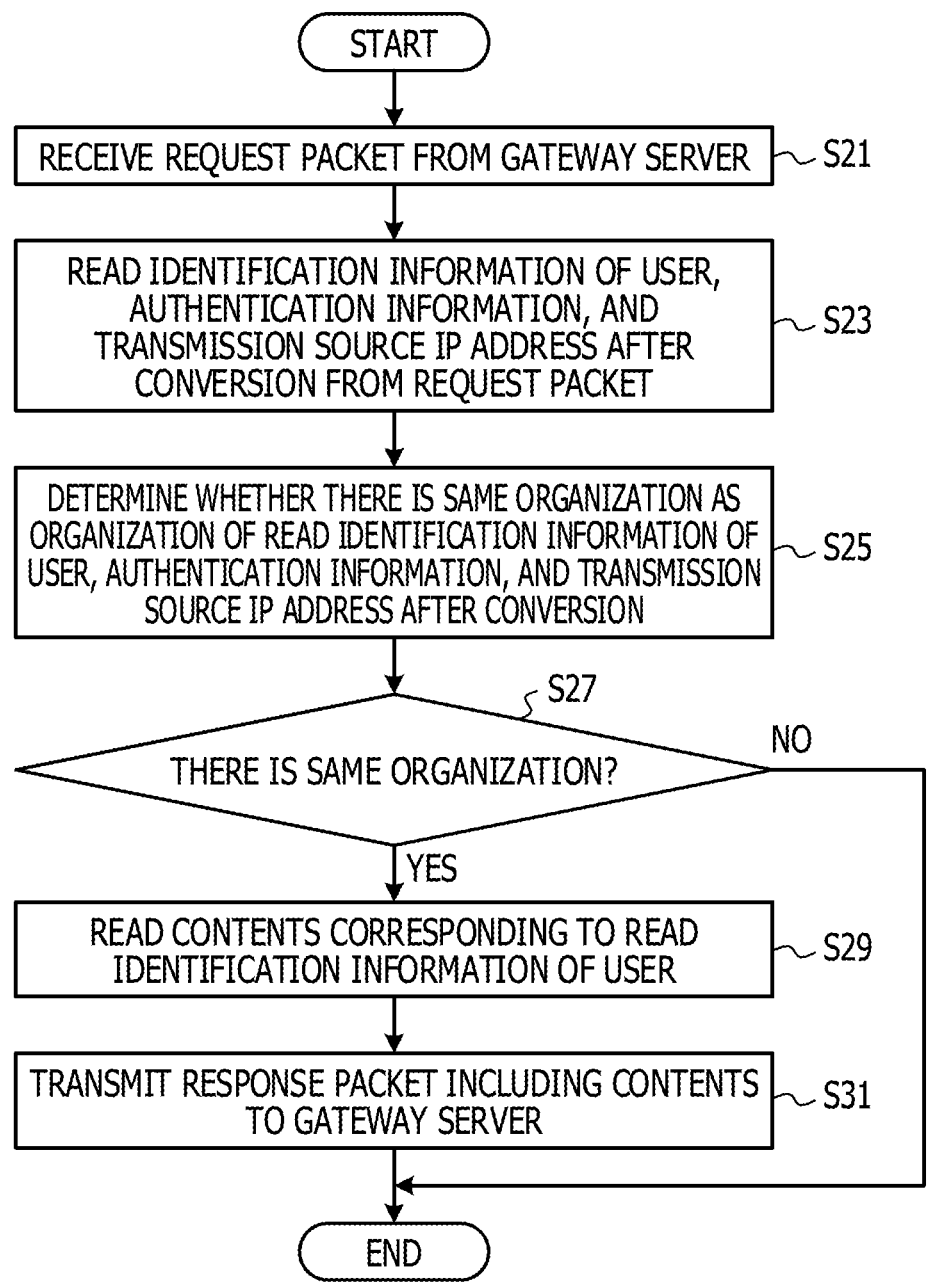
FIG. 11 is a diagram illustrating a processing flow of a processing executed by the service server.

FIG. 11 is a diagram illustrating a processing flow of a processing executed by the service server 7 in steps S9 to S15 in detail.

First, the service processing unit 701 of the service server 7 receives the request packet transmitted by the gateway server 1 (step S21 of FIG. 11).

The service processing unit 701 reads the user identification information, the authentication information, and the transmission source IP address after the conversion included in the received request packet (step S23).

The service processing unit 701 determines whether an entry having the same organization as the organization of the user identification information, the authentication information, and the transmission source IP address after the conversion read in step S23, is stored in the comparison data storing unit 703 (step S25).

When the entry having the same organization as the organization of the target is not stored in the comparison data storing unit 703 (No in step 27), there is a possibility that the terminal of the transmission source of the request packet is not the terminal of the genuine user. Because of this, the processing is terminated.

In the meantime, when the entry having the same organization as the organization of the target is stored in the comparison data storing unit 703 (Yes in step 27), the service processing unit 701 executes the processing described below. For example, the service processing unit 701 reads, from the content storing unit 705, the contents which is specified by the recipient IP address of the request packet and is the contents corresponding to the user identification information read in step S23 (step S29).

The service processing unit 701 transmits a response packet including the contents read in step S29 to the gateway server 1 with the transmission source IP address of the request packet as the recipient IP address and the recipient IP address of the request packet as the transmission source IP address (step S31). Then, the processing is terminated.

Figure 12:
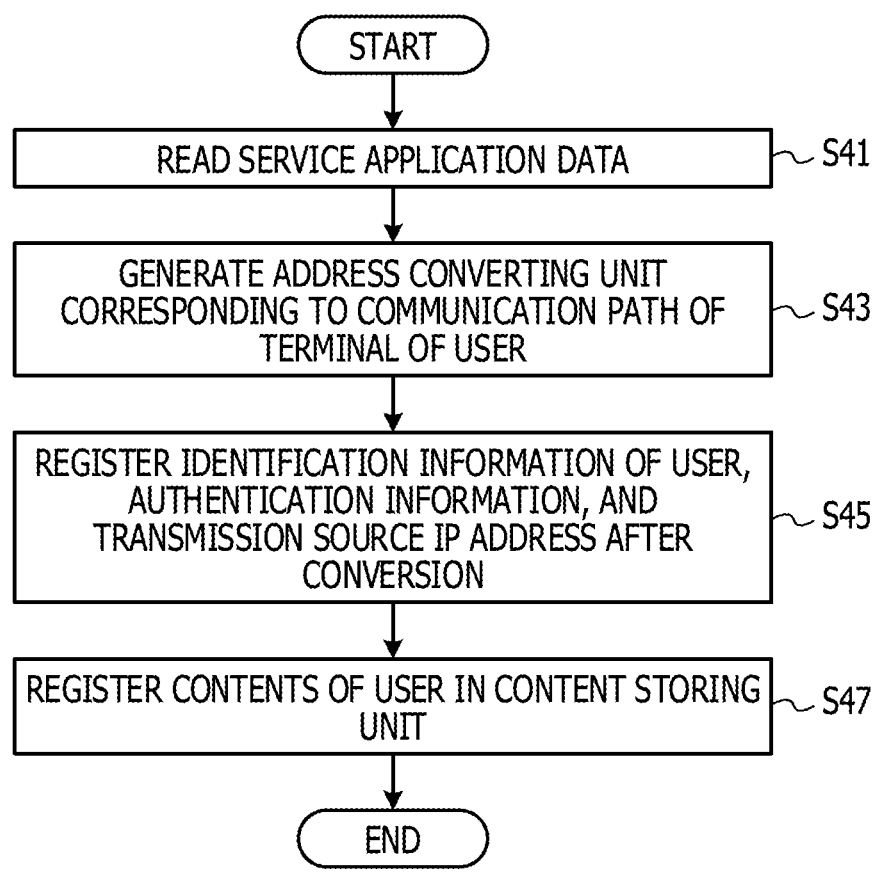
FIG. 12 is a diagram illustrating a processing flow of a processing in which the service server makes a registration for a service application.

FIG. 12 is a diagram illustrating a processing flow of a processing in which the service server 7 makes a registration for a service application. The present processing is executed, for example, when service application data is registered in the service server 7.

First, the service processing unit 701 reads service application data from the HDD 755 of the service server 7 (step S41 of FIG. 12). The service application data includes, for example, the user identification information, an ID of a tenant to which the user belongs, and the authentication information.

The service processing unit 701 makes the gateway server 1 generate an address converting unit corresponding to the communication path of the terminal of the user for the service application data (step S43). A conversion table of the generated address converting unit is different from conversion tables of other address converting units.

The service processing unit 701 registers an entry including the user identification information, the authentication information, and the transmission source IP address after the conversion (e.g., the IP address of the service server 7 side of the address converting unit generated in step S43) included in the service application data in the comparison data storing unit 703 (step S45).

The service processing unit 701 stores the contents of the user related to the service application data in the content storing unit 705 in association with the user identification information (step S47). Then, the processing is terminated.

When the processing is executed as described above, it is possible to appropriately authorize a new user receiving the cloud service.

Second Embodiment

In the first embodiment, the address converting unit is generated for each physical communication path, but in the second embodiment, an address converting unit is generated for each virtual communication path.

Figure 13:
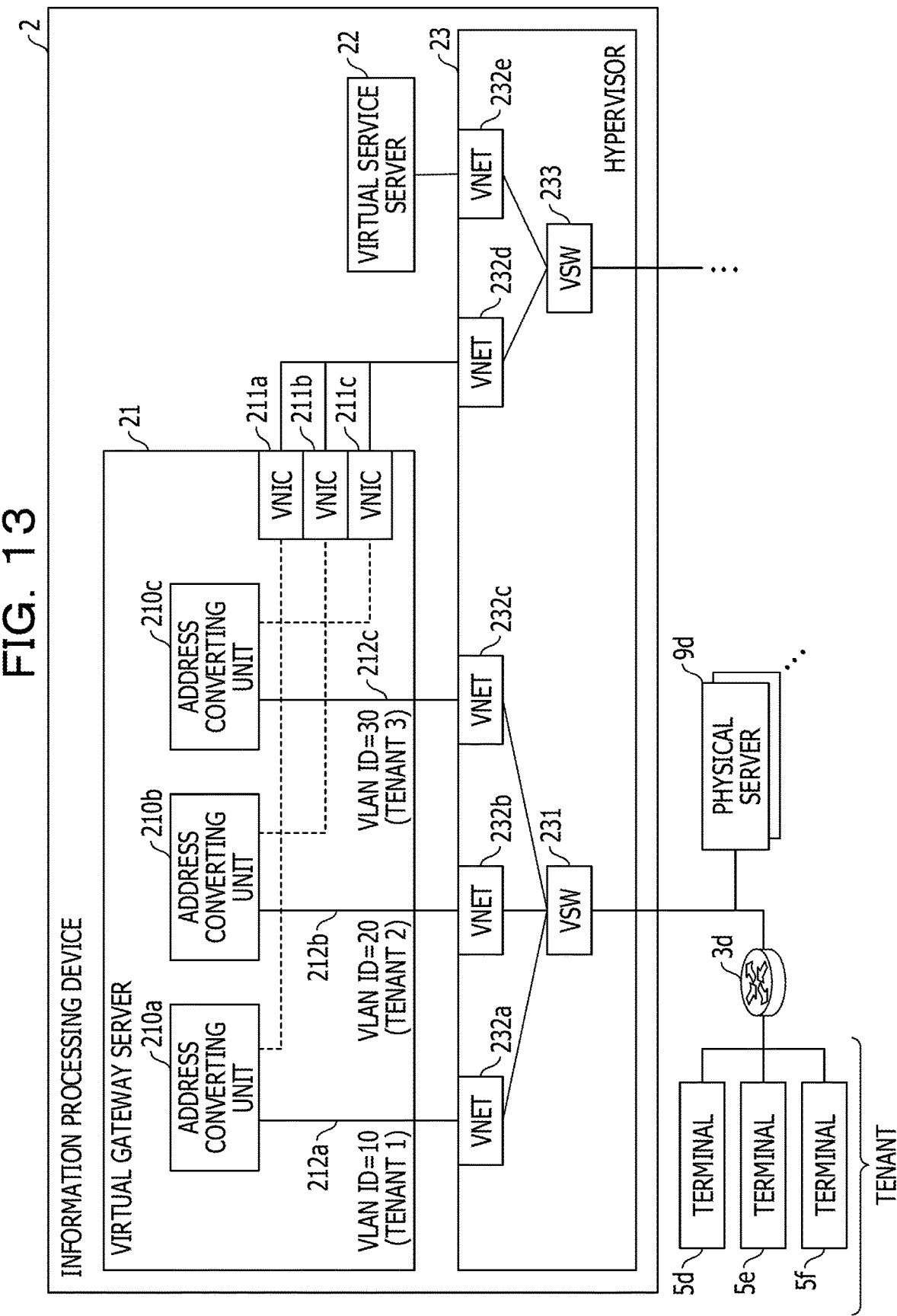
FIG. 13 is a diagram illustrating a system configuration of a second embodiment.

FIG. 13 is a diagram illustrating a system configuration of the second embodiment. In the second embodiment, an information processing device 2 executes a hypervisor 23 that is virtualization software, and a virtual gateway server 21 and a virtual service server 22 are operated in the hypervisor 23.

The hypervisor 23 includes virtual switches (VSWs) 231 and 233 and VNETs 232a to 232e corresponding to virtual ports. The VNET 232e is virtually coupled to the virtual service server 22.

The virtual gateway server 21 includes address converting units 210a to 210c, and VNICs 211a to 211c. The address converting unit 210a corresponds to tenant 1 of which a virtual local area network (VLAN) ID is "10", and receives a packet from the VNET 232a. The address converting unit 210b corresponds to tenant 2 of which a VLAN ID is "20", and receives a packet from the VNET 232b. The address converting unit 210c corresponds to tenant 3 of which a VLAN ID is "30" and receives a packet from the VNET 232c. A communication path 212a between the VNET 232a and the address converting unit 210a, a communication path 212b between the VNET 232b and the address converting unit 210b, and a communication path 212c between the VNET 232c, and the address converting unit 210c are virtual communication paths. The packet of which the address is converted by the address converting unit 210a is output from the VNIC 211a, the packet of which the address is converted by the address converting unit 210b is output from the VNIC 211b, and the packet of which the address is converted by the address converting unit 210c is output from the VNIC 211c.

Terminals 5d to 5f belong to the same tenant (herein, the tenant 1) and are also coupled to the same router (herein, a router 3d). An operator of the terminal 5d is user 11, an operator of the terminal 5e is user 12, and an operator of the terminal 5f is user 13.

The physical server 9d includes physical resources allocated to the terminals 5d to 5f by the cloud service, and a virtual machine is operated in the physical server 9d. For example, the users of the terminals 5d to 5f use the physical server 9d.

The router 3d is a relay device which relays the packets transmitted between the terminals 5d to 5f and the information processing device 2.

Further, in FIG. 13, the number of terminals is three, but is not limited.

FIG. 14 is a diagram illustrating an example of a relay table used for relay by the VSW 231. The VSW 231 reads the VLAN ID from the packets received from the terminals 5d to 5f, and specifies a VNET corresponding to the read VLAN ID in a relay table. Then, the VSW 231 outputs the packet to the specified VNET.

Figure 15:
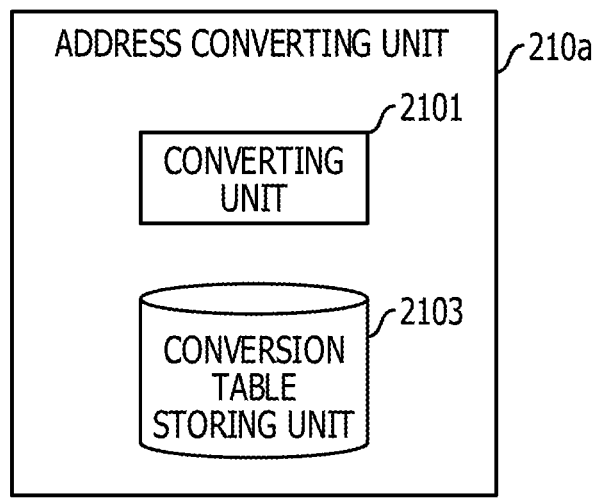
FIG. 15 is a functional block diagram of an address converting unit of the second embodiment.

FIG. 15 is a functional block diagram of the address converting unit 210a. The address converting unit 210a includes a converting unit 2101 and a conversion table storing unit 2103. The address converting unit 210a is implemented as, for example, a virtual server.

The converting unit 2101 converts an IP address included in a request packet received via the VNET 232a by using the conversion table stored in the conversion table storing unit 2103, and outputs the request packet including the converted IP address to the VNIC 211a. Further, the converting unit 2101 converts an IP address included in a response packet received via the VNIC 211a by using the conversion table stored in the conversion table storing unit 2103, and outputs the response packet including the converted IP address to the VNET 232a.

Further, the functional block configurations of the address converting unit 210b and the address converting unit 210c are the same as the functional block configuration of the address converting unit 210a. However, the address converting units 210a to 210c have different conversion tables, respectively.

FIG. 16 is a diagram illustrating an example of the conversion table stored in the conversion table storing unit 2103. The conversion table includes an IP address before the conversion and an IP address after the conversion for each of the VNET and the VNIC. In the example of FIG. 16, the IP address included in the request packet received via the VNET 232a is converted by using the entries from the first row to the third row, and the IP address included in the response packet received via the VNIC 211a is converted by using the entries from the fourth row to the sixth row.

Figure 17:
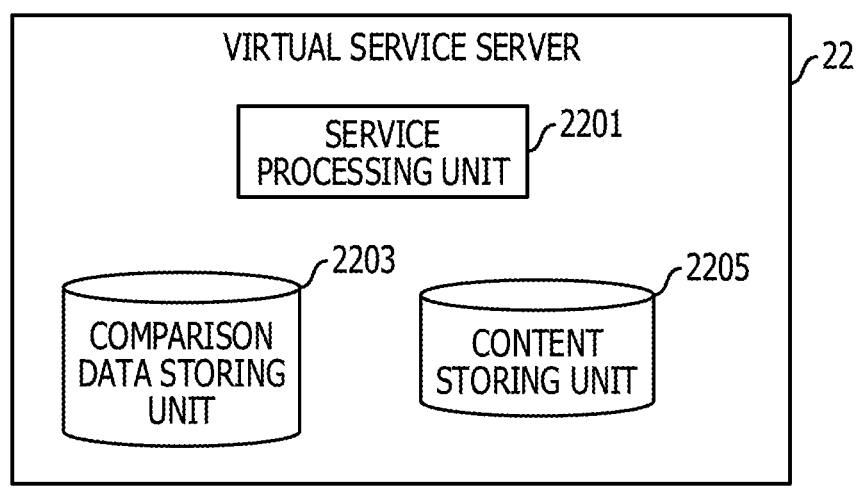
FIG. 17 is a functional block diagram of a virtual service server.

FIG. 17 is a functional block diagram of the virtual service server 22. The virtual service server 22 includes a service processing unit 2201, a comparison data storing unit 2203, and a content storing unit 2205. The service processing unit 2201 determines whether the request packet is the request packet received from the terminal of the genuine user based on the data included in the request packets received from the terminals 5d to 5f via the virtual gateway server 21 and the data stored in the comparison data storing unit 2203. When the request packet is the request packet received from the terminal of the genuine user, the service processing unit 2201 transmits a response packet including contents read from the content storing unit 2205 to a terminal of a user of a transmission source of the request packet.

FIG. 18 is a diagram illustrating an example of data stored in the comparison data storing unit 2203. In the example of FIG. 18, user identification information (in the present embodiment, user account information, such as an account name), authentication information (in the present embodiment, a password), identification information of a tenant to which a user belongs, and an IP address of a transmission source after conversion are stored. The user identification information and the authentication information are used in log-in to the terminal and the like.

Figure 19:
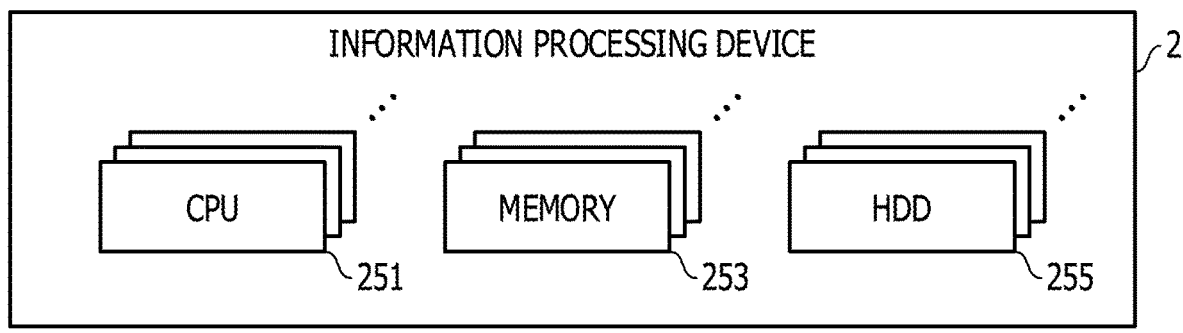
FIG. 19 is a configuration diagram of hardware of an information processing device.

FIG. 19 is a configuration diagram of hardware of the information processing device 2. The information processing device 2 includes one or a plurality of CPUs 251, one or a plurality of memories 253, and one or a plurality of HDDs 255. The hypervisor 23, the virtual gateway server 21, and the virtual service server 22 illustrated in FIG. 13 are implemented when a program loaded to a memory 253 illustrated in FIG. 19 is executed by the CPU 251 of FIG. 19. Further, the conversion table storing unit 2103, the comparison data storing unit 2203, and the content storing unit 2205 are provided in the memory 253 or in the HDD 255.

Figure 20:
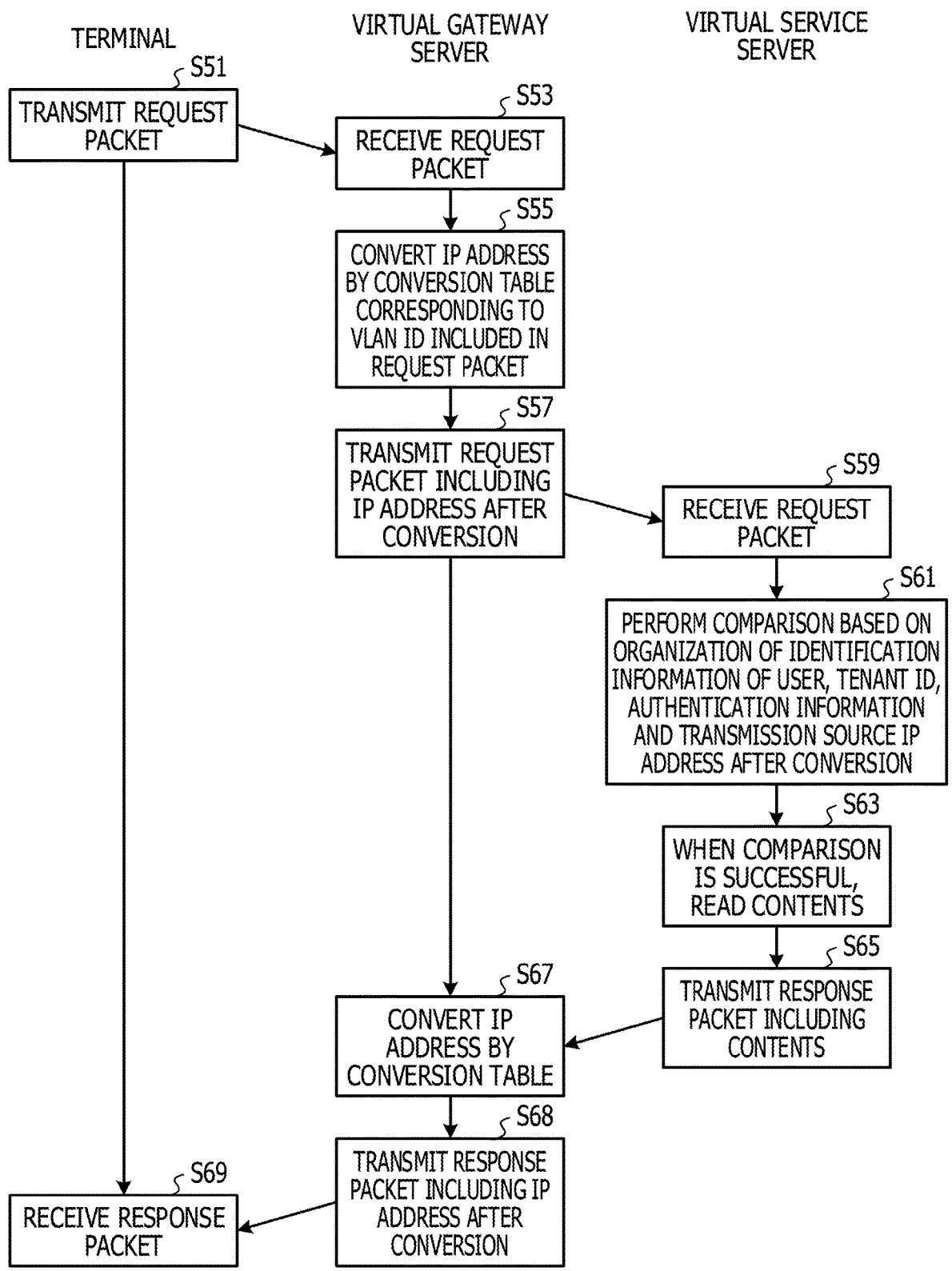
FIG. 20 is a diagram illustrating a flow processing of processing executed in a system of the second embodiment.

Next, the processing executed in the second embodiment will be described with reference to FIGS. 20 and 21. Herein, it is assumed that the terminal 5*d* transmits a request packet of contents.

The terminal 5*d* generates a request packet of contents managed by the virtual service server 22. The request packet includes identification information of a user, authentication information, a tenant ID, a transmission source IP address, a recipient IP address, and the like. Then, the terminal 5*d* transmits the generated request packet to the information processing device 2 (step S51 of FIG. 20).

The converting unit 2101 of the address converting unit 210*a* of the virtual gateway server 21 receives the request packet transmitted in step S51 via the VNET 232*a* (step S53).

The converting unit 2101 converts the transmission source IP address and the recipient IP address included in the request packet by using the conversion table corresponding to the VLAN ID included in the request packet received in step S53 (step S55).

The converting unit 2101 outputs the request packet including the transmission source IP address after the conversion and the recipient IP address after the conversion (e.g., the request packet including the converted transmission source IP address and recipient IP address) to the VNIC 211*a* (step S57).

The service processing unit 2201 of the virtual service server 22 receives the request packet output from the VNIC 211*a* (step S59).

The service processing unit 2201 determines whether an entry having the same organization as the organization of the user identification information, the authentication information, the tenant ID, and the transmission source IP address after the conversion included in the received request packet is stored in the comparison data storing unit 2203 (step S61).

When the comparison is successful (e.g., the case where the entry having the same organization as the organization of the target is stored in the comparison data storing unit 2203), the service processing unit 2201 reads, from the content storing unit 2205, contents which is specified by the recipient IP address included in the request packet and is the contents corresponding to the tenant ID included in the request packet (step S63). In step S63, the contents specified by the recipient IP address included in the request packet is read.

The service processing unit 2201 transmits the response packet including the contents read in step S63 with the transmission source of the request packet as a recipient and the recipient of the request packet as a transmission source (step S65). The response packet is transmitted to the address converting unit (herein, the address converting unit 210*a*) including the same IP address as the recipient IP address.

The converting unit 2101 of the address converting unit 210*a* receives the response packet via the VNIC 211*a*. Then, the converting unit 2101 converts the transmission source IP address and the recipient IP address included in the response packet by using the conversion table corresponding to the VLAN ID included in the response packet (step S67). Further, as illustrated in the fourth row and the fifth row of FIG. 16, there is a case where the plurality of IP addresses after the conversion corresponds to one IP address before the conversion. In this case, an appropriate converted IP address is specified by additionally using a port ID included in the response packet. However, the port ID is an example, and information (e.g., a session ID) other than the port ID may be used.

The converting unit 2101 outputs the response packet including the transmission source IP address after the conversion and the recipient IP address after the conversion (for example, the response packet including the converted transmission source IP address and recipient IP address) to the VNET 232*a* (step S68).

Then, the terminal 5*d* receives the response packet output from the VNET 232*a* (step S69).

As described above, in the second embodiment, the address converting unit operated as a proxy is provided in each virtual communication path and the address converting units execute the address conversion by using the different conversion tables, respectively. The transmission source IP address after the conversion corresponds to the IP address of the address converting unit. When the IP address is used, whether the access is made from the genuine communication path may be confirmed, so that it is possible to prevent an unauthorized access and improve security.

Figure 21:
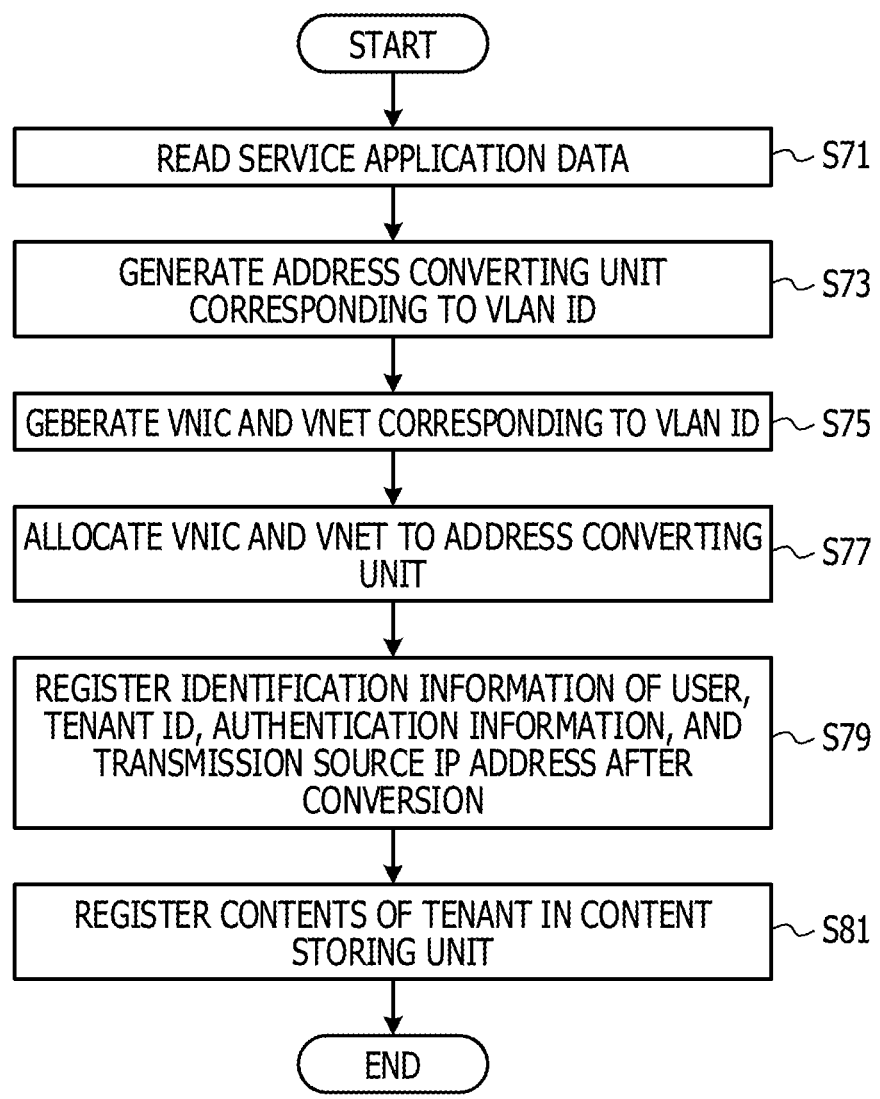
FIG. 21 is a diagram illustrating a processing flow of a processing in which the virtual service server makes a registration for a service application.

FIG. 21 is a diagram illustrating a processing flow of a processing in which the virtual service server 22 makes a registration for a service application. The present processing is executed, for example, when service application data is registered in the virtual service server 22.

First, the service processing unit 2201 reads service application data from the HDD 255 of the virtual service server 22 (step S71 of FIG. 21). The service application data includes, for example, the user identification information, an ID of a tenant to which the user belongs, the VLAN ID, the authentication information and the like.

The service processing unit 2201 makes the virtual gateway server 21 generate an address converting unit corresponding to the VLAN ID included in the service application data (step S73). A conversion table of the generated address converting unit is different from conversion tables of other address converting units.

The service processing unit 2201 makes the hypervisor 23 generate a VNET corresponding to the VLAN ID included in the service application data, and makes the virtual gateway server 21 generate a VNIC corresponding to the VLAN ID included in the service application data (step S75).

The service processing unit 2201 allocates the VNET and the VNIC generated in step S75 to the address converting unit generated in step S73 (step S77). For example, a virtual communication path between the address converting unit and the VNET and a virtual communication path between the address converting unit and the VNIC are generated.

The service processing unit 2201 registers an entry including the user identification information, the authentication information, the tenant ID, and the transmission source IP address after the conversion (for example, the IP address of the virtual service server 22 side of the address converting unit generated in step S73) included in the service application data in the comparison data storing unit 2203 (step S79).

The service processing unit 2201 stores contents of the tenant to which the user belongs for the service application data in the content storing unit 2205 in association with the tenant ID (step S81). Then, the processing is terminated.

When the processing is executed as described above, the system which is implemented by the virtualization technology may appropriately authorize a new user of the cloud service.

Third Embodiment

In the third embodiment, an address converting unit performs filtering on a packet, so that an access to contents of the virtual service server 22 is limited.

Figure 22:
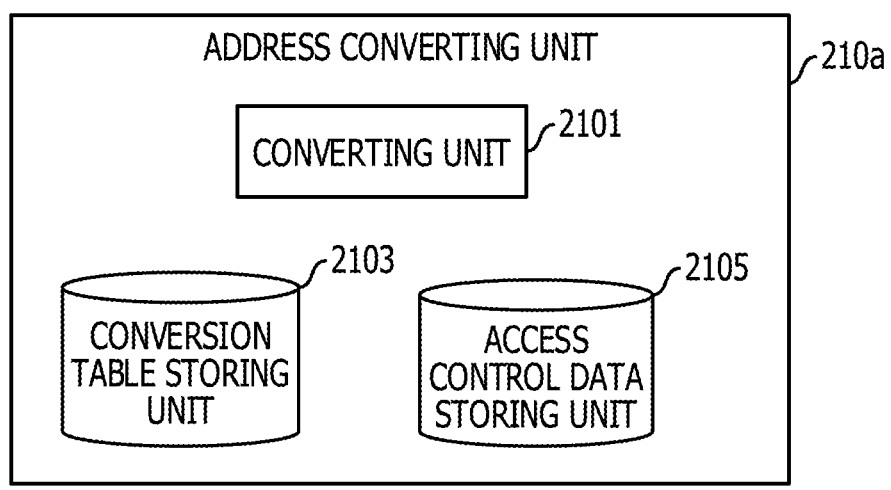
FIG. 22 is a functional block diagram of an address converting unit of a third embodiment.

In the third embodiment, the basic parts of a system configuration are the same as the system configuration of the second embodiment, but a functional block configuration of the address converting unit is different. FIG. 22 is a functional block diagram of an address converting unit 210a in the third embodiment. The address converting unit 210a includes a converting unit 2101, a conversion table storing unit 2103, and an access control data storing unit 2105.

The converting unit 2101 converts an IP address included in a request packet received via a VNET 232a by using the conversion table stored in the conversion table storing unit 2103, and outputs the request packet including the converted IP address to a VNIC 211a. Further, the converting unit 2101 converts an IP address included in a response packet received via the VNIC 211a by using the conversion table stored in the conversion table storing unit 2103, and outputs the response packet including the converted IP address to the VNET 232a. Further, the converting unit 2101 filters the request packet based on information in a protocol type included in the request packet received via the VNET 232a and the data stored in the access control data storing unit 2105.

Further, the functional block configurations of an address converting unit 210b and an address converting unit 210c are the same as the functional block configuration of the address converting unit 210a. However, the address converting units 210a to 210c have different conversion tables, respectively.

FIG. 23 is a diagram illustrating an example of data stored in the access control data storing unit 2105. In the example of FIG. 23, the transmission source IP address before the conversion, the information in the protocol type, and data indicating whether the access is permitted (hereinafter, referred to as "access control data") are stored.

Figure 24:
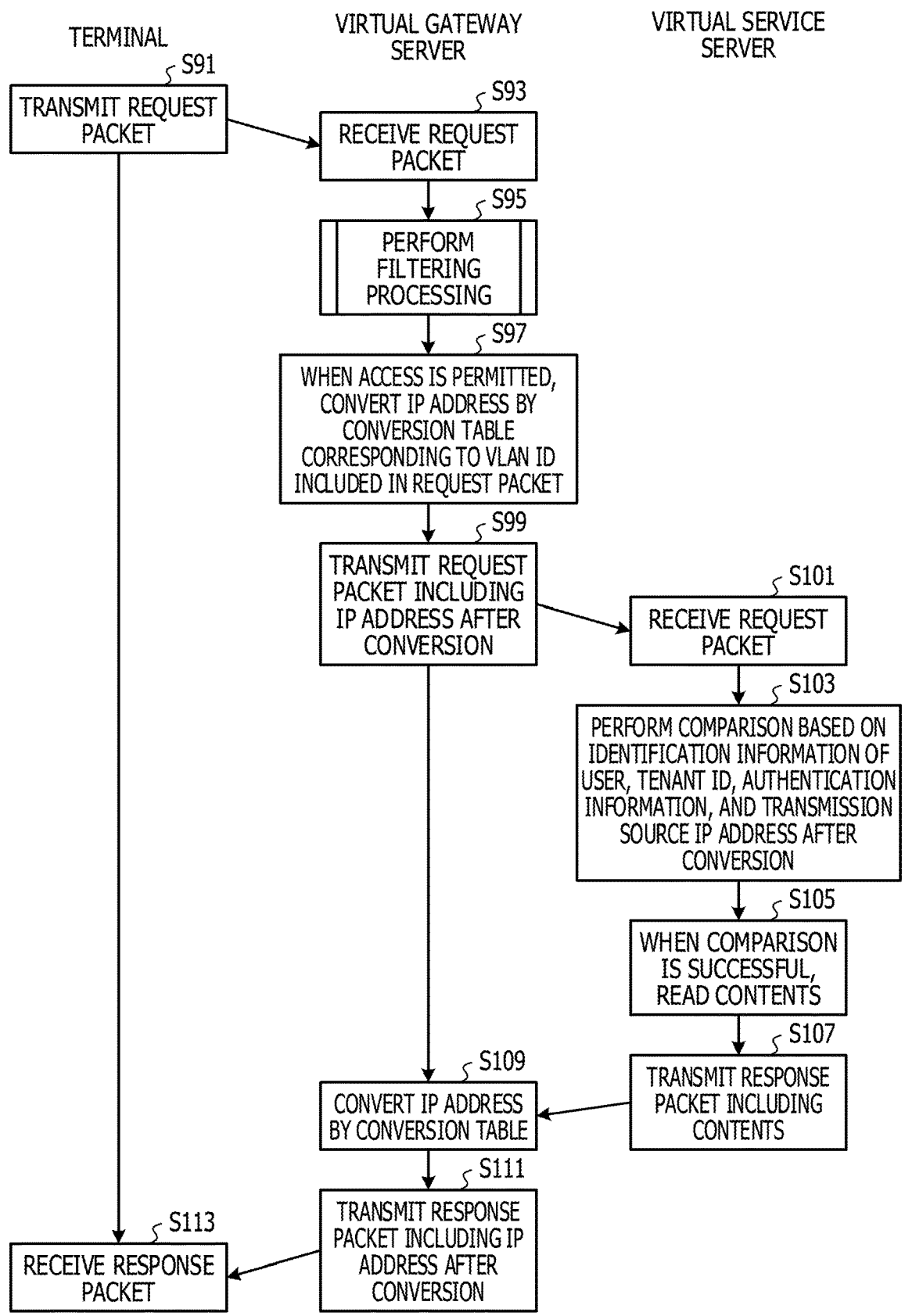
FIG. 24 is a diagram illustrating a processing flow of a processing executed in a system of the third embodiment.

The processing executed in the third embodiment will be described with reference to FIGS. 24 and 25. Herein, it is assumed that a terminal 5d transmits a request packet of contents.

The terminal 5d generates a request packet of contents managed by the virtual service server 22. The request packet includes identification information of a user, authentication information, a tenant ID, a transmission source IP address, a recipient IP address, and the like. Then, the terminal 5d transmits the generated request packet to the information processing device 2 (step S91 of FIG. 24).

The converting unit 2101 of the address converting unit 210a of the virtual gateway server 21 receives the request packet transmitted in step S91 via the VNET 232a (step S93).

Then, the converting unit 2101 executes filtering processing (step S95). The filtering processing will be described with reference to FIG. 25.

First, the converting unit 2101 reads the transmission source IP address and the information in the protocol type from the request packet. Then, the converting unit 2101 reads access control data corresponding to the transmission source IP address and the protocol type of the request packet from the access control data storing unit 2105 (step S121 of FIG. 25).

The converting unit 2101 determines whether the access of the request packet is permitted based on the read access control data (step S123). When the access of the request packet is permitted (Yes in step S123), the processing returns to a caller.

In the meantime, when the access of the request packet is not permitted (No in step S123), the converting unit 2101 discards the request packet (step S125). Then, the processing is terminated.

Referring back to FIG. 24, when the access of the request packet is permitted, the converting unit 2101 converts the transmission source IP address and the recipient IP address included in the request packet by using the conversion table corresponding to the VLAN ID (e.g., the virtual communication path 212a) included in the request packet (step S97).

The converting unit 2101 outputs the request packet including the transmission source IP address after the conversion and the recipient IP address after the conversion (e.g., the request packet including the converted transmission source IP address and recipient IP address) to the VNIC 211a (step S99).

The service processing unit 2201 of the virtual service server 22 receives the request packet output from the VNIC 211a (step S101).

The service processing unit 2201 determines whether an entry having the same organization as the organization of the user identification information, the authentication information, the tenant ID, and the transmission source IP address after the conversion included in the received request packet, is stored in the comparison data storing unit 2203 (step S103).

When the comparison is successful (e.g., the case where the entry having the same organization as the organization of the target is stored in the comparison data storing unit 2203), the service processing unit 2201 reads contents specified by the recipient IP address included in the request packet from the content storing unit 2205 (step S105). In step S105, the contents which are specified by the recipient IP address included in the request packet and are the contents corresponding to the tenant ID included in the request packet are read.

The service processing unit 2201 transmits the response packet including the contents read in step S105 with the transmission source of the request packet as a recipient and the recipient of the request packet as a transmission source (step S107). The response packet is transmitted to the address converting unit (herein, the address converting unit 210a) including the same IP address as the recipient IP address.

The converting unit 2101 of the address converting unit 210a receives the response packet via the VNIC 211a. Then, the converting unit 2101 converts the transmission source IP address and the recipient IP address included in the response packet by using the conversion table corresponding to the VLAN ID (herein, the virtual communication path 212a) included in the response packet (step S109). Further, as illustrated in the fourth row and the fifth row of FIG. 16, there is a case where the plurality of IP addresses after the conversion corresponds to one IP address before the conversion. In this case, an appropriate converted IP address is specified by additionally using a port ID included in the response packet. However, the port ID is an example, and information (e.g., a session ID) other than the port ID may be used.

The converting unit 2101 outputs the response packet including the transmission source IP address after the conversion and the recipient IP address after the conversion (e.g., the response packet including the converted transmission source IP address and recipient IP address) to the VNET 232*a* (step S111).

Then, the terminal 5*d* receives the response packet output from the VNET 232*a* (step S113).

As described above, according to the third embodiment, even though a request packet of an unauthorized access is transmitted to the virtual service server 22, since the address converting unit excludes the request packet, the unauthorized access may be prevented.

In the foregoing, the embodiments of the present disclosure have been described, but the present disclosure is not limited thereto. For example, there is a case where the functional block configurations of the gateway server 1, the information processing device 2, and the service server 7 described above do not correspond to actual program module configurations.

Further, the configuration of each table described above is an example, and the table does not need to essentially have the foregoing configuration. Further, in the processing flow, as long as a processing result is not changed, a sequence of the processing may be changed. Further, the processing may be executed in parallel.

Further, the value of the IP address illustrated in the drawing is an example, and the IP address does not need to essentially have the foregoing value.

Further, in the first embodiment, the filtering processing described in the third embodiment may be executed.

The aforementioned embodiments of the present disclosure may be summarized as follows.

An address converting device according to a first aspect of the present embodiment includes (A) a receiving unit (e.g., the VNET 105 in the embodiment) which receives a request packet of contents from a first information processing device, (B) a converting unit (e.g., the converting unit 101 in the embodiment) which converts a first transmission source address included in the request packet to a second transmission source address by using a conversion table corresponding to a communication path of the request packet, and (C) a transmitting unit (e.g., the VNIC 107 in the embodiment) which transmits the request packet to a second information processing device which determines whether to provide the contents based on the second transmission source address included in the request packet.

In the foregoing configuration, when the communication path is different, the transmission source address is converted to another transmission source address, so that the second information processing device may discriminate a request packet received from a genuine communication path from other request packets. Accordingly, security of the service providing the contents may be improved.

Further, the request packet may additionally include identification information (e.g., user account information of an operator) and authentication information (e.g., a password) used for log-in to the first information processing device. Further, the second information processing device may additionally determine whether to provide the contents based on the identification information and the authentication information.

Since the second transmission source address is used, even when the identification information and the authentication information are stolen, an unauthorized access to the contents may not be performed.

Further, the converting unit may (b1) convert the first transmission source address to the second transmission source address by using a conversion table corresponding to a physical communication path of the request packet.

Further, the converting unit may (b2) convert the first transmission source address to the second transmission source address by using a conversion table corresponding to a virtual communication path of the request packet.

This may cope with a case where a physical communication path cannot be prepared for each transmission source and the like.

Further, the receiving unit may (a1) receive the response packet including the contents from the second information processing device. Then, the converting unit may (b3) convert a first recipient address included in the response packet to a second recipient address by using a conversion table corresponding to a communication path of the request packet, and the transmitting unit may (c1) transmit the response packet including the second recipient address to the first information processing device.

The response packet is appropriately returned.

Further, the converting unit may (b4) determine whether an access of a terminal of a transmission source of the request packet to the contents is permitted based on protocol information included in the request packet, and (b5) when the access of the terminal of the transmission source of the request packet to the contents is not permitted, the converting unit may discard the request packet.

The improper request packet may be discarded in the operation before the request packet reaches the second information processing device.

An information processing system according to a second aspect of the present embodiment includes (D) a first information processing device (e.g., in the embodiment, the terminals 5*a* to 5*c*), (E) an address converting device (for example, in the embodiment, the gateway server 1), and (F) a second information processing device (e.g., in the embodiment, the service server 7). Then, the address converting device includes (e1) a receiving unit (for example, in the embodiment, the VNET 105) which receives a request packet of contents from a first information processing device, (e2) a converting unit (e.g., in the embodiment, the converting unit 101) which converts the first transmission source address included in the request packet to a second transmission source address by using a conversion table corresponding to a communication path of the request packet, and (e3) a transmitting unit (e.g., in the embodiment, the VNIC 107) which transmits the request packet to the second information processing device. Further, the second information processing device includes (f1) a determining unit (e.g., in the embodiment, the service processing unit 701) which determines whether to provide the contents based on the second transmission source address included in the request packet received from the address converting device.

An address converting method according to a third aspect of the present embodiment may include (G) receiving a request packet of contents from a first information processing device, (H) converting a first transmission source address included in the request packet to a second transmission source address by using a conversion table corresponding to a communication path of the request packet, and (I) transmitting the request packet to a second information processing device which determines whether to provide the contents based on the second transmission source address.

Further, a program which causes a processor to perform processing according to the method described above may be written, and the program, for example, is stored in a computer-readable recording medium or a memory device, such as a flexible disk, a CD-ROM, a magneto-optical disk, a semiconductor memory, and a hard disk. Further, an intermediate processing result is temporarily stored in a memory device, such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A device for converting an address, the device comprising:
    a memory; and
    a processor coupled to the memory and configured to:
        receive a request packet of contents from a first information processing device included in information processing devices;
        convert a first transmission source address included in the request packet to a second transmission source address by using a first conversion table included in conversion tables which are associated with the respective information processing devices, the first conversion table corresponding to a communication path between the first information processing device and the processor through which the request packet is transmitted; and
        transmit the request packet to a second information processing device which is different from the information processing devices and determines whether to provide the contents based on the second transmission source address included in the request packet.

2. The device according to claim 1, wherein the request packet includes identification information and authentication information used for log-in to the first information processing device, and the second information processing device determines whether to provide the contents based on the identification information and the authentication information.

3. The device according to claim 1, wherein the processor converts the first transmission source address to the second transmission source address by using the first conversion table corresponding to a physical communication path of the request packet.

4. The device according to claim 1, wherein the processor converts the first transmission source address to the second transmission source address by using the first conversion table corresponding to a virtual communication path of the request packet.

5. The device according to claim 1, wherein the processor:
    receives a response packet including the contents from the second information processing device;
    converts a first recipient address included in the response packet to a second recipient address by using the first conversion table corresponding to the communication path of the request packet; and
    transmits the response packet including the second recipient address to the first information processing device.

6. The device according to claim 1, wherein the processor:
    determines whether a terminal of a transmission source of the request packet is permitted to access the contents based on protocol information included in the request packet; and
    discards, when the terminal of the transmission source of the request packet is not permitted to access the contents, the request packet.

7. A system for processing information, the system comprising:
    a first information processing device included in information processing devices;
    an address converting device; and
    a second information processing device which is different from the information processing devices,
    the address converting device includes:
        a memory; and
        a processor coupled to the memory and configured to:
            receive a request packet of contents from the first information processing device;
            convert a first transmission source address included in the request packet to a second transmission source address by using a first conversion table included in conversion tables which are associated with the respective information processing devices, the first conversion table corresponding to a communication path between the first information processing device and the processor through which the request packet is transmitted; and
            transmit the request packet to the second information processing device, and the second information processing device is configured to determine whether to provide the contents based on the second transmission source address included in the request packet received from the address converting device.

8. The system according to claim 7, wherein the processor converts the first transmission source address to the second transmission source address by using the first conversion table corresponding to a physical communication path of the request packet.

9. The system according to claim 7, wherein the processor converts the first transmission source address to the second transmission source address by using the first conversion table corresponding to a virtual communication path of the request packet.

10. The system according to claim 7, wherein the processor:
    receives a response packet including the contents from the second information processing device;
    converts a first recipient address included in the response packet to a second recipient address by using the first conversion table corresponding to the communication path of the request packet; and
    transmits the response packet including the second recipient address to the first information processing device.

11. The system according to claim 7, wherein the processor:
    determines whether a terminal of a transmission source of the request packet is permitted to access the contents based on protocol information included in the request packet;
    and when the terminal of the transmission source of the request packet is not permitted to access the contents, discards the request packet.

12. A method of providing a service, the method comprising:
- receiving, by an address converting device in an information processing system including a first information processing device included in information processing devices and a second information processing device which is different from the information processing devices, a request packet of contents from the first information processing device;
- converting, by the address converting device, a first transmission source address included in the request packet to a second transmission source address by using a first conversion table included in conversion tables which are associated with the respective information processing devices, the first conversion table corresponding to a communication path between the first information processing device and the processor through which the request packet is transmitted;
- transmitting, by the address converting device, the request packet to the second information processing device; and
- determining, by the second information processing device, whether to provide the contents based on the second transmission source address included in the request packet received from the address converting device.

13. The method according to claim 12, wherein the first transmission source address is converted to the second transmission source address by using the first conversion table corresponding to a physical communication path of the request packet.

14. The method according to claim 12, wherein the first transmission source address is converted to the second transmission source address by using the first conversion table corresponding to a virtual communication path of the request packet.

15. The method according to claim 12, further comprising:
- receiving a response packet including the contents from the second information processing device;
- converting a first recipient address included in the response packet to a second recipient address by using the first conversion table corresponding to the communication path of the request packet; and
- transmitting the response packet including the second recipient address to the first information processing device.

16. The method according to claim 12, further comprising:
- determining whether a terminal of a transmission source of the request packet is permitted to access the contents based on protocol information included in the request packet; and
- when the terminal of the transmission source of the request packet is not permitted to access the contents, discarding the request packet.

* * * * *